United States Patent [19]
Winski

[11] Patent Number: 5,803,703
[45] Date of Patent: Sep. 8, 1998

[54] CASE LOADING SYSTEM

[75] Inventor: Ernest P. Winski, Oshkosh, Wis.

[73] Assignee: Goldco Industries, Inc., Loveland, Colo.

[21] Appl. No.: 240,167

[22] Filed: May 9, 1994

Related U.S. Application Data

[63] Continuation-in-part of Ser. No. 100,271, Aug. 2, 1993, abandoned, which is a continuation-in-part of Ser. No. 76,272, Jun. 11, 1993, abandoned, which is a continuation of Ser. No. 653,302, Feb. 11, 1991, abandoned.

[51] Int. Cl.$^6$ .................................................. B65G 37/00
[52] U.S. Cl. ...................................... 414/741.6; 414/792.6
[58] Field of Search ............................... 198/347.1, 357, 198/358; 414/799, 790.9, 791, 791.6, 792.6, 791.9, 798.9

[56] References Cited

U.S. PATENT DOCUMENTS

| | | | |
|---|---|---|---|
| 2,470,922 | 5/1949 | Dunn | 198/357 |
| 2,875,907 | 3/1959 | Locke et al. | 414/791.6 |
| 3,094,225 | 6/1963 | Repasky et al. | 198/358 |
| 3,608,698 | 9/1971 | Crall | 198/358 |
| 3,756,374 | 9/1973 | Burt et al. | 198/358 |
| 3,892,318 | 7/1975 | Berndt et al. | 414/791.9 |
| 3,905,489 | 9/1975 | Berndt et al. | 414/791.9 |
| 3,917,080 | 11/1975 | Jones | 414/791.9 |
| 3,986,597 | 10/1976 | Valentino | 198/358 |
| 4,143,752 | 3/1979 | Del Rosso | 198/358 |
| 4,222,478 | 9/1980 | Gasser | 198/358 |
| 4,762,219 | 8/1988 | Walters et al. | 198/358 |
| 4,939,891 | 7/1990 | Padini | 414/791.6 |

*Primary Examiner*—Karen M. Young
*Assistant Examiner*—Gregory A. Morse
*Attorney, Agent, or Firm*—Robert E. Harris

[57] ABSTRACT

This invention pertains to load forming systems, especially those designed to place cased product on e.g. a pallet. The invention contemplates receiving cases at a high rate of input, and fragmenting the input, sending it to parallel processing elements of the load forming system. A layer creating subsystem has parallel processing elements, and preferably has sufficient designed throughput capacity to continue processing cases at the overall rated capacity of the case loading system when any one of the parallel processing elements in the layer creating subsystem fails. The case loading subsystem also can incorporate parallel layer transfer elements and load forming elements.

34 Claims, 2 Drawing Sheets

CASE LOADING SYSTEM

This application is a continuation in part of application Ser. No. 08/100,271, filed Aug. 2, 1993, now abandoned, which is a continuation in part of application Ser. No. 08/076,272, filed Jun. 11, 1993, now abandoned, which is a continuation of Ser. No. 07/653,302, filed Feb. 11, 1991, now abandoned, which applications are incorporated herein by reference. Also incorporated herein by reference, for disclosure of case loading systems, are my U.S. Pat. Nos. 4,704,060 issued Nov. 3, 1987, and 4,988,264 issued Jan. 29, 1991.

FIELD OF THE INVENTION

This invention relates to palletizers and other load forming systems, and methods of forming unit loads, especially where units of material are placed on pallets or the like, e.g. for shipping or for further handling.

This invention relates especially to load forming systems such as case loading systems wherein product in corrugated cardboard cases is automatically loaded onto pallets by pallet loading apparatus, without manual labor to move the cases.

BACKGROUND OF THE INVENTION

The term "pallet" as used herein means a pallet or other rigid supporting structure which holds a generally planar shape while holding a layer of material, while itself being supported by a fork lift having two spaced forks about 4–6 inches wide, as commonly used to support a load e.g. 36 inches wide, measured in a direction transverse to the direction of extension of the forks.

As used herein, "pallet" includes conventional pallets, e.g. about 3 to 4 inches thick, as well as lesser thickness rigid support plates, such as e.g. pressed fibrous sheets, sold under the trademark MASONITE®.

The term "load" refers to one or more layers of units of material (e.g. cased product) which are combined together for simultaneous handling by a single handling device, such as a fork lift handling a pallet load, a platen truck handling a unit load on a slip sheet, or a clamp truck handling a unit load, without a slip sheet, by clamping the load between clamps positioned at the sides of the load.

As used herein, the phrase "steady state" means that product is coming out of the load forming system at the same or a faster rate than product is going into the load forming system.

As used herein "designed throughput capacity" refers to the steady state throughput capacity, in number of cases/units of product per minute, which the respective apparatus can be reasonably expected to handle with a high degree of reliability (e.g. greater than 90% up-time). In many applications, the reliable throughput capacity is related to the line speed at which the cases advance along the conveyor or other material handling apparatus. The reliable speed of throughput for a given application is a function of, as examples, the type and structure of a corresponding conveyor, the size and structure of the cases being handled, and the nature and length of the path being traversed by the respective element.

When I refer to the number of "cases per minute" processed by the case loading system of the invention, or by a subsystem, I mean the average number of cases per minute when considering routine cycling of the system through its various operating steps, including routine cycling of the feed stream to parallel processing elements of the system.

By "parallel processing elements" I refer to more than one processing element or subsystem where multiple elements perform the same type of operation, but where a given case is processed through only one of the respective processing elements.

In my patent U.S. Pat. No. 4,704,060, I teach a palletizer/load forming system including an in-feed conveyor, a layer forming station, a transfer plate, and a load forming station, all fixed in location such that units of material to be processed are brought to the layer forming station, and to the transport plate, and must be delivered to the load forming station. Typically, the units of material are received from a production line. The palletizer/load forming system, as taught in the '060 patent, is advantageously used where the volume of material coming from a single production line, and/or processed through a single in-feed conveyor justifies the cost of the palletizing equipment.

In my patent U.S. Pat. No. 4,988,264, I teach a depalletizing system wherein the depalletizer used is physically very similar in construction to the palletizer taught in U.S. Pat. No. 4,704,060. However, in e.g. FIGS. 1 and 3 of that teaching, I teach the concept of shuttling a plurality of pallet loads into and out of the in-feed position without necessarily emptying any particular load before shuttling in another load.

In application Ser. No. 08/076,272, I teach in e.g. FIGS. 11A, 12, and 13, the concept of receiving material into the load forming system from at least two in-feed conveyors, with the various in-feed conveyors presenting product from different production lines, potentially presenting a plurality of products which must be kept separated, forming the material so-received into layers in at least two layer forming stations, and depositing the material in layers on pallets in at least two load forming stations.

The '272 invention greatly improves the cost benefit of mechanizing the load forming operation where the output of no single production line justifies a load forming system, but wherein a combination of production lines, if all fed through one load forming system, does justify the equipment expense.

In application Ser. No. 08/100,271, I teach a load forming system having a plurality of layer forming stations, receiving material from a corresponding plurality of production lines, and placing the formed layers on a plurality of load forming stations. A mobile, ground-supported transport vehicle is used to transport the formed layers to the load forming stations, thus obviating need for elevated transport-supporting superstructure to extend along the full length of the path of travel of the transport plate among the several layer forming stations and load forming stations.

SUMMARY OF THE INVENTION

It is an object of this invention to provide a load forming system capable of fragmenting, and otherwise processing, the input provided by one or more high speed product conveyors, wherein the feed stream of cases from the product conveyor is fragmented in a layer creating subsystem in the load forming system, and wherein the cases are processed at speeds slower than the speeds encountered on the product conveyor.

It is another object to provide a load forming system having a designed overall throughput capacity, including a layer transfer subsystem, a load creating subsystem, and a layer creating subsystem, the layer creating subsystem having at least two parallel sets of processing elements, and sufficient throughput capacity that the parallel sets of processing elements, less one, have a throughput capacity at least as great as the designed overall throughput capacity of the load forming system.

It is a further object of the invention to provide a case loading system having at least two layer transfer plates for receiving layers formed in a layer forming station, and depositing the layers on loads.

It is yet another object to provide a load forming system having a layer creating subsystem, a load creating subsystem, and a layer transfer subsystem, wherein the layer transfer subsystem includes at least two layer transfer plates, for receiving layers formed in the layer creating subsystem and depositing the layers on loads in the load creating subsystem.

It is still another object of the invention to provide a method of handling cases of product received on a product conveyor, and received into a load forming system, by distributing the cases to more than one in-feed conveyor of a layer creating subsystem, by sensing availability of unused capacity in each of parallel operating elements of the layer creating subsystem, and delivering cases to an operating element having available capacity.

It is finally an object to provide such a method of handling cases of product wherein, as a result of parallel processing in one or more subsystems of the load forming system, the cases are processed at a slower rate in the layer creating subsystem than on the product conveyor.

Some of the objects are obtained in a first set of embodiments of the invention, comprising a load forming system for receiving cases of product, and for forming loads of the cases, in layers. In this set of embodiments, the case loading system comprises a product conveyor; a layer creating subsystem comprising at least first and second case converting subsystems, the case converting subsystems comprising corresponding (i) at least first and second layer forming stations, and (ii) at least first and second in-feed conveyors, each in-feed conveyor having a receiving locus configured and positioned to receive cases of product from the product conveyor, and a discharge locus configured and positioned to discharge cases of product to the corresponding layer forming station, whereby both case converting subsystems receive cases of product from the product conveyor in parallel, the first and second layer forming stations being configured and positioned to receive cases of product from the corresponding in-feed conveyors and to form the cases of product into layers; a load creating subsystem, comprising at least one load forming station for receiving layers of cased product formed in the layer creating subsystem, and for forming the layers into loads; and a controller for controlling the operating elements of the case loading system.

The product conveyor preferably has a first designed throughput capacity for transporting cases of product thereon, the case loading system further comprising a layer transfer subsystem, for (i) receiving layers formed in the layer forming stations, and for (ii) depositing the layers on corresponding loads being formed in the load creating subsystem, the layer transfer subsystem having a designed throughput capacity at least as great as the designed throughput capacity of the product conveyor, and at least as great as the designed throughput capacity, in combination, of the case converting subsystems, less any one case converting subsystem.

Preferably, the in-feed conveyors, less any one in-feed conveyor, in combination, have a designed throughput capacity at least as great as the designed throughput capacity of the product conveyor. Also preferably, the layer forming stations, less any one layer forming station, in combination, have a designed throughput capacity at least as great as the throughput capacity of the product conveyor.

It is further preferred that the case converting subsystems, less any one case converting subsystem, in combination, have a designed throughput capacity at least as great as the designed throughput capacity of the product conveyor.

In preferred embodiments of the case loading system, the case converting subsystems have capacities such that, when the product conveyor is operating at its designed throughput capacity, the throughput from the product conveyor can be handled by the layer creating subsystem only by delivering cases from the product conveyor to at least two of the case converting subsystems; preferably all of the case converting subsystems, less one.

It is also preferred that the layer transfer subsystem comprise at least two transfer plates, each transfer plate being adapted and configured for receiving a layer formed in the layer creating subsystem and delivering the layer to the load creating subsystem. Since the transfer plates seldom fail, the designed throughput capacity of the layer transfer subsystem, less any one transfer plate, can be, and typically is, less than the designed throughput capacity of the product conveyor.

It is further preferred that the load creating subsystem comprise at least two load forming stations.

In some embodiments, each load forming station receives layers from only one of the transfer plates. In other embodiments, each load forming station receives layers from both transfer plates.

Preferably, each in-feed conveyor includes a product demand sensor for signalling product demand to the controller, and a conveyor full sensor for signalling the controller that the respective in-feed conveyor is full.

Others of the objects are obtained in a second set of embodiments of the invention, comprising, generally, a layer creating subsystem, for receiving cases of product, and forming the cases into layers, the layer creating subsystem comprising at least one layer forming station; a load creating subsystem, for receiving layers formed in the layer creating subsystem, and forming the layers into a load, the load creating subsystem comprising at least one load forming station; a layer transfer subsystem, for receiving layers formed in the layer creating subsystem, and for delivering the layers to the load creating subsystem, the layer transfer subsystem comprising at least first and second transfer plates, each of the transfer plates being disposed and configured to receive a layer formed in the layer creating subsystem, and to deliver the layer to the load creating subsystem; and a controller for controlling operation of operating elements of the load forming system.

Additional ones of the objects are achieved in a case loading system for receiving cases of product, and forming loads of the cases, in layers, the case loading system having a first overall designed throughput capacity, and comprising a layer creating subsystem comprising at least first and second layer forming stations; a load creating subsystem, comprising at least first and second load forming stations for receiving layers of cased product formed in the layer creating subsystem, and for forming the layers into loads; and a controller for controlling operation of the operating elements of case loading system, the load creating subsystem, less any one of the load forming stations, having a second designed throughput capacity less than the first overall designed throughput capacity, and the at least first and second layer forming stations, less any one layer forming station, in combination, having a third designed throughput capacity at least as great as the first overall designed throughput capacity of the case loading system.

The invention also contemplates a case loading system having a first overall designed throughput capacity, the case loading system comprising a layer creating subsystem comprising at least first and second layer forming stations; a load creating subsystem, for receiving layers of cased product formed in the layer creating subsystem, and for forming the layers into loads; a layer transfer subsystem, for receiving layers formed in the layer creating subsystem, and for depositing the layers onto corresponding loads being formed in the load creating subsystem, the layer transfer subsystem comprising at least first and second transfer plates; and a controller for controlling operation of operating elements of the case loading system, the layer transfer subsystem, less any one of the transfer plates, having a second designed throughput capacity less than the first overall designed throughput capacity, and the at least first and second layer forming stations, less any one layer forming station, in combination, having a third designed throughput capacity at least as great as the first overall designed throughput capacity of the case loading system.

Preferably, the layer creating subsystem includes at least three layer forming stations whereby, if any one of the layer forming stations fails, the remaining operational layer forming stations can, in combination, process cases at the first overall designed throughput capacity with each of the remaining operational layer forming stations, individually, processing cases at less than the first overall designed throughput capacity.

In a third set of embodiments, the invention contemplates a method of handling cases of product, received on a product conveyor at a given rate in cases per minute, and forming loads with the cases in layers, by processing the cases through a case loading system, the case loading system comprising a layer creating subsystem comprising at least first and second case converting subsystems, each case converting subsystem comprising a layer forming station, and an in-feed conveyor for receiving cases from the product conveyor and discharging cases to the corresponding layer forming station, a case demand sensor for signalling current availability of capacity on the corresponding in-feed conveyor, and a "conveyor full" sensor; a load creating subsystem comprising at least one load forming station; and a controller for controlling operation of operating elements of the case loading system, the method comprising the steps of sensing any current availability of capacity in each case converting subsystem, and the corresponding ability to receive cases of product on the corresponding in-feed conveyor; and delivering cases of product from the product conveyor to the layer creating subsystem in accordance with the sensed current availability of capacity of each case converting subsystem to receive cases, whereby the number of cases per minute processed by any one case converting subsystem is less than the number of cases per minute delivered to the layer creating subsystem by the product conveyor.

The method preferably includes, once having begun delivering cases to a given case converting subsystem, continuing to deliver, to the given case converting subsystem, all subsequent cases delivered by the product conveyor until the conveyor full sensor indicates that the respective given case converting subsystem is full.

Preferably, cases are delivered from the product conveyor to the case converting subsystems in an order corresponding to the sequence in which available capacity in the case converting subsystems is sensed.

The invention further contemplates a method of handling cases of product, received on a product conveyor at a given rate in cases per minute, and forming loads with the cases in layers, the method comprising receiving the cases into a case loading system, at the given rate, and processing the cases through the case loading system, the case loading system comprising a layer creating subsystem comprising at least first and second case converting subsystems, a layer transfer subsystem comprising at least one layer transfer plate, a load creating subsystem comprising at least one load forming station, and a controller, the case loading system having an overall throughput capacity capable of processing cases at the given rate, the layer transfer subsystem and the load creating subsystem having throughput capacities such that failure of operation at any layer transfer plate or at any load forming station reduces the effective overall throughput capacity of the case loading system to a capacity below the given rate of receipt of product from the product conveyor. However, the layer creating subsystem has sufficient throughput capacity that any one case converting subsystem can fail and the case loading system maintains its overall throughput capacity, including throughput through the remaining case converting subsystems, at a rate at least as great as the given rate of receipt of product from the product conveyor.

The preferred method includes processing cases of product through all the case converting subsystems so long as all case converting subsystems are operational, shutting down a case converting subsystem when it experiences an operational failure, and subsequently diverting all cases delivered by the product conveyor to the remaining operational case converting subsystems, correcting the failure in the failed case converting subsystem, and again processing cases of product through all case converting subsystems, all while receiving cases from the product conveyor at the given rate, and without accumulating any substantial quantity of the cases received from the product conveyor.

Preferably, the case loading system comprises at least three case converting subsystems whereby, when a failure occurs in one case converting subsystem, and all cases are delivered to the remaining operational case converting subsystems, the rate of flow of cases through any one of the operational case converting subsystems is less than the given rate of receipt of cases from the product conveyor into the case loading system.

The essence of the invention is in designing a case loading system by determining relative amounts of potentially disruptive failure time caused by each of the major subsystems—the layer creating subsystem, the layer transfer subsystem, and the load creating subsystem; and for any subsystem causing a disproportionate amount of potentially disruptive failure time for the system, providing in the relevant subsystem at least two sets of parallel processing elements, with a combined processing capacity in the subsystem, including in the parallel processing elements, such that when any one set of the parallel processing elements fails, the remaining operational ones of the corresponding sets of parallel processing elements, in combination, have a designed throughput capacity at least as great as the first overall designed throughput capacity of the case loading system.

DETAILED DESCRIPTION OF THE ILLUSTRATED EMBODIMENTS

Figure 1:
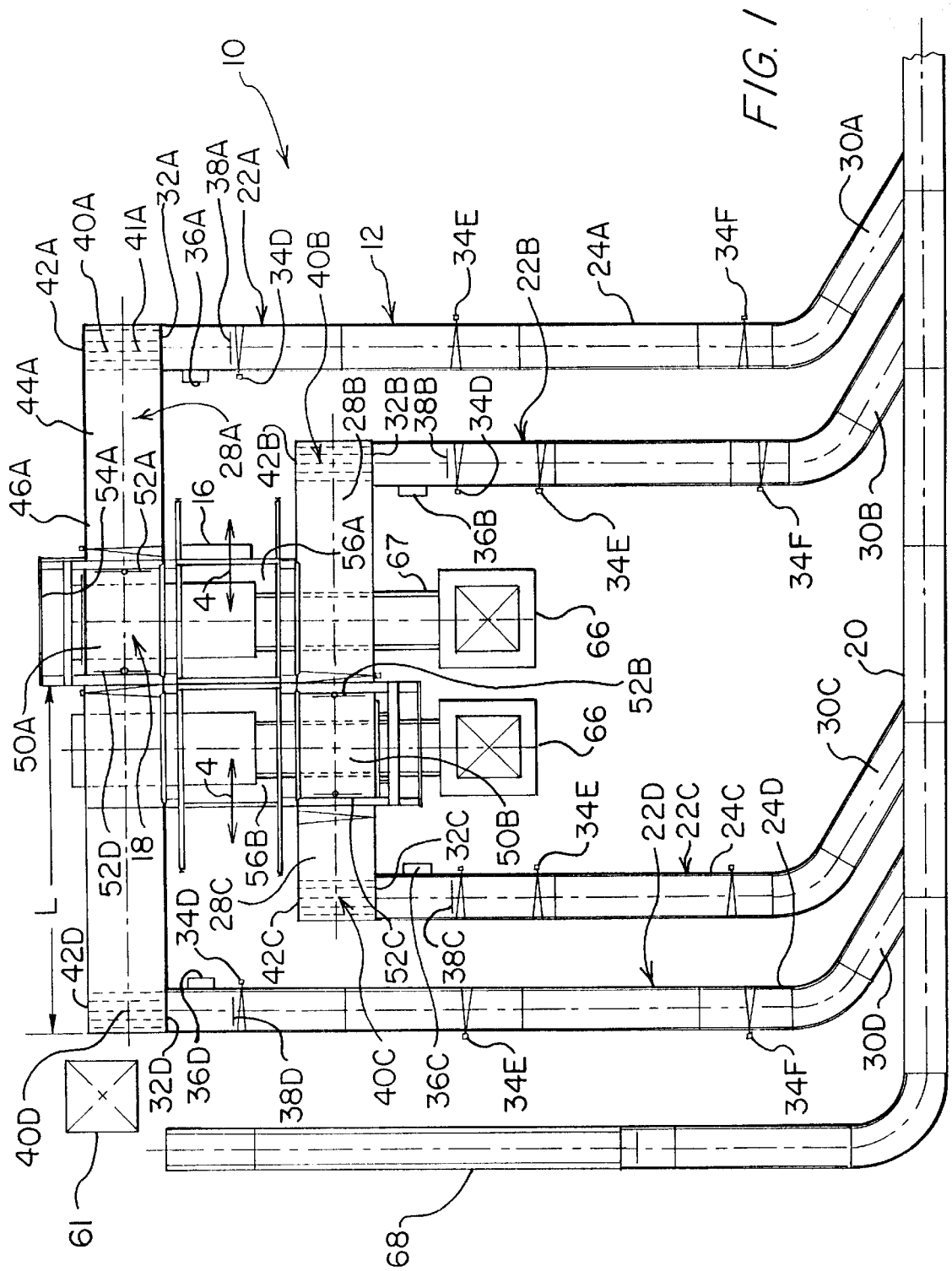
FIG. 1 shows a plan view layout of a case loading system of this invention.
Figure 2:
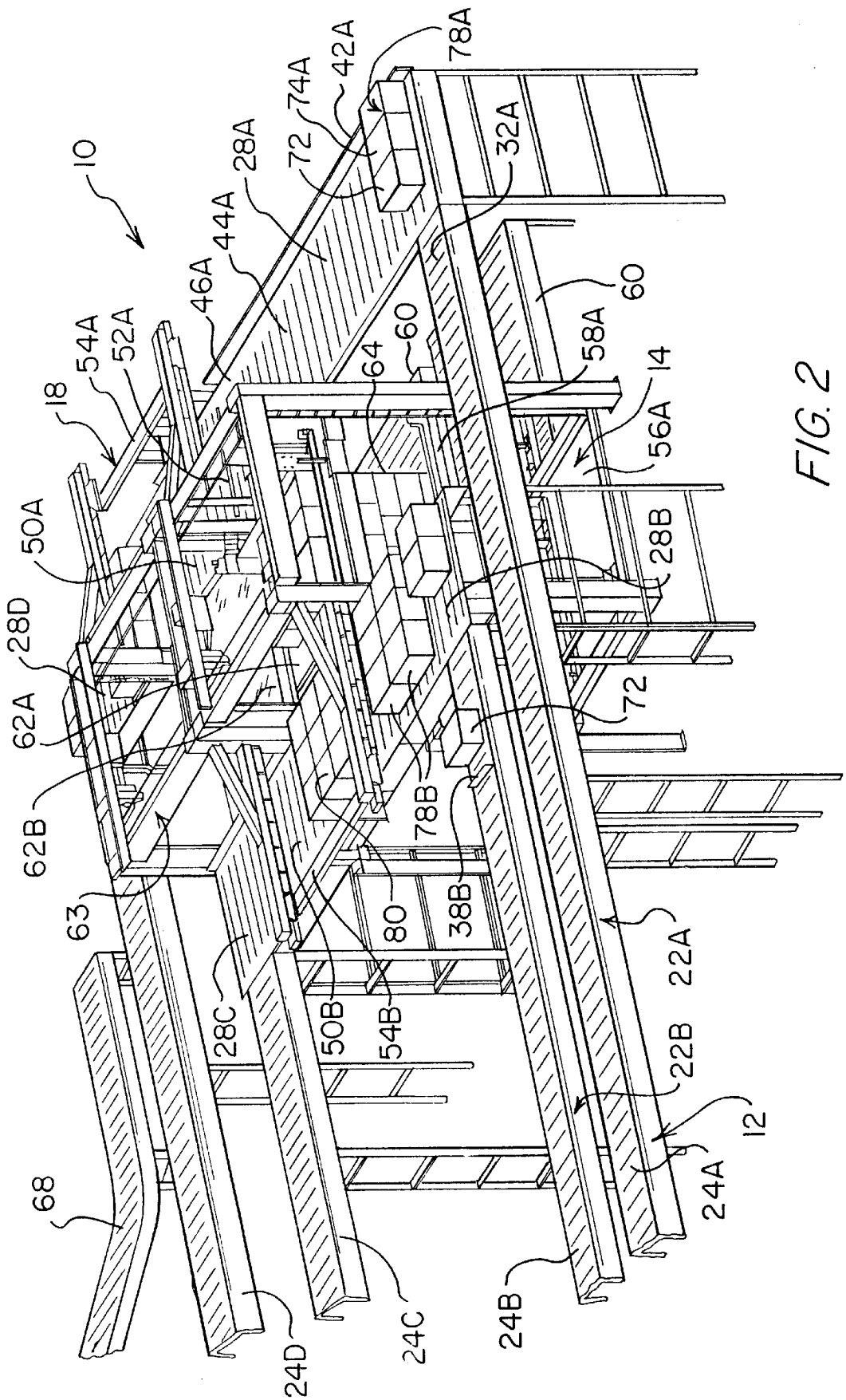
FIG. 2 generally shows a pictorial view of most elements of the case loading system of FIG. 1.

Referring now to the drawings, the case loading system 10, as illustrated, generally includes a layer creating subsystem 12, a load creating subsystem 14, and a controller 16. The illustrated case loading system also includes a layer transfer subsystem 18 and a product conveyor 20.

Layer creating subsystem 12 receives cases of product individually from the product conveyor, and generally combines the individual cases into layers, each layer being created from a plurality of the cases.

In the illustrated case loading system 10, the layer creating subsystem 12 includes four case converting subsystems 22A, 22B, 22C, and 22D. Each case converting subsystem 22A–22D includes an in-feed conveyor 24A–24D, and a layer forming station 28A–28D.

Each in-feed conveyor 24A–24D is sized to allow the conveyor to receive individual cases of product from the product conveyor, with all cases following a common path along the respective in-feed conveyor. Each in-feed conveyor 24A–24D has a receiving locus 30A–30D for receiving cases of product from the product conveyor 20, and a discharge locus 32A–32D for discharging the cases to the respective layer forming station 28A–28D. Each in-feed conveyor also has a number of sensors 34D–34F (e.g. electric eyes) for sensing the presence or absence of product cases at respective given locations on the conveyor. For example, the case demand sensors 34D, located near layer forming stations 28D, signal the controller 16 when the respective in-feed conveyor is nearly empty, placing a "demand" against the system, to receive more product/cases. "Conveyor full" sensors 34F, located closer to the product conveyor 20, signal the controller 16 when the respective in-feed conveyor is nearly full, whereupon the controller directs product which is arriving on the product conveyor toward an in-feed conveyor which is not issuing a "full" signal.

Each in-feed conveyor 24A–24D further includes a case turning module 36A–36D.

Finally, each in-feed conveyor 24A–24D has a vertically movable stop 38A–38D, which rises up between respective rollers or the like, to stop advance of cases past the respective stop.

Each layer forming station 28A–28D includes a row-forming pop-up section 40A–40D for forming rows of cases by receiving cases from the respective in-feed conveyor 24A–24D, and advancing the cases across the layer forming station 28A–28D and thus against stop 42A–42D. Pop-up section 40A includes a pop-up conveyor 41A which is raised to advance cases across the pop-up section, then is retracted downwardly, to allow the main drive system of the layer forming station 28A to move the formed row along the row-feed section 44A, toward the layer assembly section 46A. All of the pop-up sections include respective pop-up conveyors to advance cases of product.

As a set of cases, appropriate for forming a row for the specified layer, proceeds onto the pop-up conveyor, the leading case proceeds against stop 42A. The cases following proceed against the leading case and against each other, thus forming the set of cases into a row.

Each layer forming station generally includes a driven conveyor extending from the respective in-feed conveyor to the respective layer holding station described hereinafter, and includes a pop-up section 40A–40D for receiving cases onto the layer forming station, a row-feed section 44A for advancing the formed rows along the length "L" of the layer forming station, to the respective layer assembly section 46A. The illustrated case loading system includes four such layer forming stations.

The load creating subsystem 14 comprises a pair of load forming stations 56A, 56B. Each load forming station includes a carriage 58, described in, for example my U.S. Pat. Nos. 4,704,060 and 4,988,264, which supports a pallet or other portable load bearing structure, and moves the pallet vertically as needed as the load is being formed. The carriage also incorporates a powered conveyor, not shown, for receiving and positioning empty pallets, and for ejecting the loads onto corresponding discharge conveyors 60.

In the illustrated system, the layer transfer subsystem 18 includes a pair of transfer plates 62A and 62B and a corresponding pair of layer holding stations 50A and 50B. Each transfer plate 62A, 62B is mounted to the frame 63, for generally horizontal movement with respect to the floor.

Each layer holding station 50A, 50B typically comprises a driven conveyor, for receiving layers formed in the layer forming stations 28A–28D. Each layer holding station 50A, 50B also includes a pusher 54A, 54B, whose operation is described hereinafter.

Each transfer plate receives layers of cases from the respective layer holding station, and deposits the layers onto corresponding underlying loads.

Each layer forming station further includes a layer stop 52A–52D, generally located adjacent opposing ends of the respective layer holding station 50A, 50B. Thus, the system illustrated includes layer stops 52A, 52B, 52C, and 52D.

The controller 16 is a conventional electronic controller, which operates to control the case loading system 10. Through strategically placed sensors and controls, controller 16 senses the movement of material into and through the case loading system, and controls operation of the system, and thus the movement of the cases of product, and the layers and loads made with the cases. Accordingly, the controller senses cases of product on the product conveyor as they approach the in-feed conveyors. The controller also senses cases as they traverse e.g. the in-feed conveyors, the layer forming stations, the transfer plates, and the load forming stations. Movement of empty and loaded pallets is also sensed using sensors.

Controller 16 is programmed, for example by an operator, with the number of cases to be placed in a row, the number of rows in a layer, and the number of layers to be placed on a pallet to make up a pallet load.

Controller 16 uses the sensed information, the programmed instructions, and its memory of the progress of cases through the system to issue control commands to the various operating elements of the case loading system, including assigning individual cases, or groups of cases, to specific case converting subsystems 22A–22D.

The product conveyor 20, as shown, is a high-speed transport, which delivers cased product to the case loading system. For example, the product conveyor might deliver 100 cases of product per minute to the case loading system. In the embodiment illustrated, the cases delivered by the product conveyor can be intermingled with each other in any order in the process of creating e.g. pallet loads.

By contrast, the failure rate per million cases processed, for a linear assemblage of case loading elements, including an in-feed conveyor, a layer forming station, and a load forming station, is typically related to the number of cases per minute which pass through the system. Generally, such an assemblage, when processing cases one at a time, cannot operate at steady state conditions for any length of time at throughputs of 100 cases per minute, because such speeds generally do not allow enough time to reliably orient the cases, and position the cases as the layers are formed. The typical result is frequent jamming of cases in the equipment, causing shut-down of the equipment while the jam is cleared by e.g. an operator.

The inventor herein has investigated the relative amounts and frequencies of potentially disruptive failures of each subsystem. He has discovered that the most common failures are the above jamming failures, which occur most frequently in the layer creating subsystem when a case is being acted on, either to turn the case, or to incorporate the case into a row or a layer. Once the layer is formed, the handling of the layers, and the loads formed from the layers, generally can proceed without failures.

Accordingly, the case loading system 10 is directed toward fragmenting the feed stream of cases coming into the system, and simultaneously processing the corresponding fragments in parallel processing elements, namely four case converting subsystems 22A–22D in the system illustrated, to create e.g. pallet loads 64.

Fragmenting the feed stream promotes the reliability of the case loading system in two ways. First, the line speed in the case converting subsystems, measured in e.g. feet per minute travelled by a given case, is reduced significantly below the line speed on the product conveyor 20, correspondingly reducing the number of failures per million cases processed.

Second, by properly designing the overall case loading system, as further described hereinafter, in the process of converting the individual cases into layers, the system typically tolerates whatever failures do occur, without reducing overall operational steady state throughput capacity of the system below the rate at which cases are received on the product conveyor.

Referring to FIG. 1, pallet dispensers 66 feed empty pallets on, for example, chain conveyor 67, to the load forming stations 56A, 56B as directed by the controller 16. The pallets, after subsequent loading, are discharged from the system on discharge conveyors 60, either to further conveying to e.g. a loading dock, or for pick up by a fork truck or the like.

The case loading system, as illustrated in the drawings, further includes an overflow conveyor 68. In the rare event a failure in the system does cause loss of overall operational steady state throughput capacity of the system to below the rate at which cases are received on the product conveyor, cases can be directed to the overflow conveyor 68, from where they can be manually placed on pallets 61.

Cases of product 72 enter the case loading system 10 from product conveyor 20. The case converting subsystems 22A–22D signal their demand for cases when the sensors 34D detect an absence of cases adjacent the respective sensors. Controller 16 receives the "demands," and directs cases to the case converting subsystems 22A–22D in the order in which the demands are received. However, once controller 16 begins directing cases to a particular case converting subsystem, it continues to direct all subsequent cases to that particular case converting subsystem until the respective conveyor full sensor 34F signals the controller that cases are backed up on the corresponding in-feed conveyor, up to the conveyor full sensor 34F. When the "conveyor full" signal is received, the controller then directs cases to the case converting subsystem next in line with its "case demand" signal from the corresponding case demand sensor 34D.

The cases are propelled along the various conveyances and conveyors in the system by conventional drive assemblies, not shown.

The steps in processing cases through the case loading system will now be addressed by describing the progress of cases as they pass through case converting subsystem 22A.

Cases 72 enter the in-feed conveyor 24A at a receiving locus 30A; typically entering and traversing the in-feed conveyor in single file. A set 74A of cases, including a lead case, and enough additional cases to make up a row in a layer, can pass along the entire length of the in-feed conveyor 22A without stopping. Once the last case in the set 74A has passed stop 38A on the in-feed conveyor, the stop 38A is raised, temporarily preventing additional cases from passing onto the layer forming station.

As the lead case approaches the discharge locus 32A of the in-feed conveyor, the pop-up section 40A of layer forming station 28A pops up, and carries the cases across the row-forming pop-up section of the layer forming station, still in single file, driving the lead case into abutment with stop 42A, and the following cases serially into abutment against the leading case. Meanwhile, any case turning required is accomplished as the cases pass case turning module 36A.

The step of bringing the cases into abutment with each other, and abutted against stop 42A, assembles the respective set of cases into a formed row 78A. Once the row is formed, the pop-up conveyor 41A withdraws downwardly, and the row is driven along the row feed section 44A toward the corresponding layer assembly section 46A.

When the first row 78A has moved out of the pop-up section 40A, stop 38A is retracted, and a second set of cases is driven onto the pop-up section 40A, and thus onto the layer forming station 28A. Again, as the last case in the set passes stop 38A, stop 38A is raised to temporarily prevent additional cases from passing, until after the second set has been formed into a row and has passed out of the pop-up section 40A. Additional sets of cases are similarly processed from the discharge locus of the in-feed conveyor onto the pop-up section 40A of the layer forming station.

The rows 78A advance from the pop-up section toward the layer assembly section 46A. As the rows approach the layer assembly section 46A, the stop 52A is raised, or is maintained in the raised position. The lead row 78A advances until it abuts against stop 52A. Additional rows follow the lead row 78A, and are urged into abutment with row 78A, and with each other. The resulting assemblage of rows creates a layer 80, comprised of a series of rows, each row including a series of cases.

By "series" of rows and cases, in each event, I mean at least two cases or rows, as each word applies.

When controller 16 senses that the layer holding station is empty, and pusher 54A is retracted to the position shown in the drawings, stop 52A is retracted, and the formed layer is driven into the layer holding station 50A. Once the entire layer has passed, stop 52A is again raised, and another layer can begin forming at the layer assembly section 46A. The formed layer is then pushed onto the transfer plate 62A by pusher 54A. In the meantime, carriage 58A has raised the underlying pallet or partial load to a height just below the transfer plate 62A.

With the layer on the transfer plate 62A, and with the underlying load directly under the transfer plate, and at a height just below the transfer plate, the transfer plate is withdrawn from under the layer, in a direction moving parallel to the length of the layer forming station, as shown by the arrows in FIG. 1, depositing the layer onto the load.

Additional layers are placed on the load in the same manner until the load is full. The load is then discharged on the discharge conveyor.

When layer holding station 50A is empty before the layer is fully assembled at layer assembly section 46A, the stop 52A can be retracted, allowing the rows and/or a partially formed layer to enter the layer holding station directly. In such case, final assembly of the layer takes place in the layer holding station. As soon as the number of rows required to form a layer have passed the stop 52A, stop 52A is raised, and another layer can begin forming at the layer assembly section 46A.

In typical operation of case loading systems of the invention, the steps described above with respect to the path traversed by cases traversing case converting subsystem 22A are simultaneously carried out in all of the corresponding case converting subsystems 22A, 22B, 22C, and 22D, as needed. The implementation of this simultaneous operation of all such subsystems is orchestrated and controlled by the controller 16.

Layer holding station 50A receives rows and layers from layer forming stations 28A and 28D, and transfers the layers to transfer plate 62A, which deposits the layers on underlying loads in load forming station 56A. Layer holding station 50B receives rows and layers from layer forming stations 26B and 26C, and transfers the layers to transfer plate 62B, which deposits the layers on underlying loads in load forming station 56B.

In other embodiments not shown herein, each load forming station 56A, 56B can receive layers formed in any and all of the layer forming stations.

If one of the case converting subsystems fails, e.g. because of a jam, cases will stop progressing through the corresponding in-feed conveyor 24A–24D. Any cases coming into that in-feed conveyor will accumulate until the corresponding conveyor full sensor 34F signals the controller that the conveyor is full. Once the controller receives the "conveyor full" signal, it stops sending cases to that case converting subsystem until it receives a case demand signal. Such case demand signal will, of course, only be received after the jam has been cleared and the cases on the in-feed conveyor have passed the respective case demand sensor 34D.

In the meantime, the controller continues to send cases to the remaining three case converting subsystems as the corresponding case demand sensors 34D send demand signals to the controller.

The efficiency of the case loading systems of the invention derives from processing cases through the system in functionally parallel processing elements, and building excess designed throughput capacity into the combined parallel elements of the system, with the ability to automatically transfer the processing load away from a failed parallel processing element, and have that transferred processing load picked up by the remaining operational ones of the parallel processing elements. Since most failures occur after the cases enter the in-feed conveyor, and before the layer is fully formed, the system preferably includes excess designed throughput capacity in the layer creating subsystem, namely by using the combination of the case converting subsystems as parallel processing elements.

The minimum excess throughput capacity in the layer creating subsystem is that wherein the combination of all the case converting subsystems, less one, has sufficient steady state operational throughput capacity to process all cases received on the product conveyor at the product conveyor's designed throughput capacity.

In order to obtain the added benefit of processing cases in the layer creating subsystem at a cases per minute rate less than the rate at which cases are delivered by the product conveyor, the "less one" number of case converting subsystems must provide for parallel processing of the cases e.g. in at least two case converting subsystems. Thus the typical minimum number of case "converting subsystems less one" is two case converting subsystems, which means that the overall layer creating subsystem typically includes at least three case converting subsystems. That way, when one case converting subsystem fails, the remaining two operational case converting subsystems can process all the cases delivered by the product conveyor, with each case converting subsystem operating at a cases per minute rate lower than the rate at which cases are delivered by the product conveyor.

EXAMPLE

Product conveyor 20 delivers cases at its designed throughput capacity of 100 cases per minute. Each case converting subsystem is designed to receive and process cases at the rate of 35 cases per minute. Thus, the combined designed throughput capacity of the overall system, including the product conveyor 20, is 100 cases per minute. But the designed throughput capacity of the layer creating subsystem 12, comprising the four case converting subsystems in combination, is 140 cases per minute. More importantly, if one of the case converting subsystems fails, the remaining three case converting subsystems have a combined throughput capacity of 105 cases per minute, which is greater than the 100 cases per minute rate at which the product conveyor delivers product to the layer creating subsystem. Thus, when one case converting subsystem fails, the remaining three case converting subsystems can continue to receive and process all the product delivered by the product conveyor 20, even while the jam is being cleared, or the failed case converting subsystem is otherwise repaired.

Accordingly, the parallel processing capability built into the case loading systems of the invention provides for continuing processing of cases received into the system when one of the case converting subsystems fails. By building sufficient throughput capacity into the layer creating subsystem to continue processing at the overall rate demanded by the project when a case converting subsystem fails, a high rate of up-time can be assured.

If a second case converting subsystem should fail before the first failed subsystem is returned to operation, the two remaining operational case converting subsystems will continue to process cases at the rate of 70 cases per minute, and 30 cases per minute would be diverted to the overflow conveyor.

The rated capacities of the layer transfer subsystem and the load creating subsystem are generally the same as the rated capacity of the layer creating subsystem, e.g. 140 cases per minute in the above example, equally shared by the respective parallel processing elements. Thus, if a layer holding station, a layer transfer plate, or a load forming station fails, the remaining throughput capacity of the operational one or more parallel processing elements is typically less than the rated throughput capacity of the product conveyor, e.g. 70 cases per minute in the above EXAMPLE. Thus, systems of the invention normally do not provide sufficient throughput capacity in the layer transfer subsystem or the load creating subsystem to continue system rated throughput on the infrequent occasions when failure occurs at a layer holding station, a layer transfer plate, or a load forming station. Based on the infrequent occurrence of failures at the layer holding station, the transfer plate, and the load forming station, as disclosed herein, additional such capacity in these subsystems is not economically justified.

Thus, this invention provides a load forming system capable of fragmenting, and otherwise processing, the input provided by one or more high speed product conveyors, wherein the feed stream of cases from the product conveyor is fragmented in a layer creating subsystem in the load forming system, and wherein the cases are processed at speeds slower than the speeds encountered on the product conveyor.

The invention also provides a load forming system having a designed overall throughput capacity, including a layer transfer subsystem, a load creating subsystem, and a layer creating subsystem, the layer creating subsystem having at least two parallel sets of processing elements, and sufficient throughput capacity that the parallel sets of processing elements, less one, have a throughput capacity at least as great as the designed overall throughput capacity of the load forming system.

The invention further provides a case loading system having at least two layer transfer plates for receiving layers formed in a layer forming station, and depositing the layers on loads.

The invention yet further provides a load forming system having a layer creating subsystem, a load creating subsystem, and a layer transfer subsystem, wherein the layer transfer subsystem includes at least two layer transfer plates, for receiving layers formed in the layer creating subsystem and depositing the layers on loads in the load creating subsystem.

The invention still further provides a method of handling cases of product received on a product conveyor, and received into a load forming system, by distributing the cases to more than one in-feed conveyor of a layer creating subsystem, by sensing current availability of unused capacity in each of parallel operating elements of the layer creating subsystem, and delivering cases to an operating element having currently available capacity.

The invention finally provides such a method of handling cases of product wherein, as a result of parallel processing in one or more subsystems of the load forming system, the cases are processed at a slower rate in the layer creating subsystem than on the product conveyor.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A case loading system for receiving cases of product, and for forming loads of the cases, in layers, with said case loading system having an overall designed throughput capacity, said case loading system comprising;

(a) a product conveyor;
(b) a layer creating subsystem comprising at least first and second case converting subsystems, said at least first and second case converting subsystems comprising corresponding (i) at least first and second layer forming stations, and (ii) at least first and second in-feed conveyors, each said in-feed conveyor having a receiving locus configured and positioned to receive cases of product from said product conveyor, and a discharge locus configured and positioned to discharge cases of product to the corresponding said layer forming station, whereby both of said first and second case converting subsystems receive cases of product from said product conveyor, said first and second layer forming stations being configured and positioned to receive cases of product from the corresponding said in-feed conveyors and to form the cases of product into layers;
(c) a load creating subsystem, comprising at least one load forming station for receiving layers of cased product formed in said layer creating subsystem, and for forming the layers into loads; and
(d) at least one of said product conveyor, layer creating subsystem, and said load creating subsystem being designed to have a throughput capacity greater than said overall designed throughput capacity of said case loading system.

2. A case loading system as in claim 1, said product conveyor having a first designed throughput capacity for transporting cases of product thereon, said case loading system further comprising a layer transfer subsystem, for (i) receiving layers formed in said layer forming stations to said load creating subsystem, and for (ii) depositing the layers on corresponding loads being formed in said load creating subsystem, said layer transfer subsystem having a designed throughput capacity at least as great as the designed throughput capacity, in combination, of said at least first and second case converting subsystems, less any one said case converting subsystem.

3. A case loading system as in claim 2, said layer transfer subsystem comprising at least two transfer plates, each said transfer plate being adapted and configured for receiving a layer formed in said layer creating subsystem and delivering the layer to the load creating subsystem, wherein the designed throughput capacity of said layer transfer subsystem, less any one transfer plate, is less than the designed throughput capacity of said product conveyor.

4. A case loading system as in claim 3 wherein said load creating subsystem comprises at least two load forming stations.

5. A case loading system as in claim 2, said product conveyor having the first designed throughput capacity for transporting cases of product thereon, said at least first and second case converting subsystems, less any one of said case converting subsystems, in combination, having a designed throughput capacity at least as great as said designed throughput capacity of said product conveyor.

6. A case loading system as in claim 2, said at least first and second layer forming stations, less any one of said layer forming stations, in combination, having a designed throughput capacity at least as great as said first designed throughput capacity of said product conveyor.

7. A case loading system as in claim 1, said product conveyor having a first designed throughput capacity for transporting cases of product thereon, said at least first and second in-feed conveyors, less any one of said in-feed conveyors, in combination, having a designed throughput capacity at least as great as said designed throughput capacity of said product conveyor.

8. A case loading system as in claim 7, said layer transfer subsystem comprising at least two transfer plates, each said transfer plate being adapted and configured for receiving a layer formed in said layer creating subsystem and delivering the layer to the load creating subsystem, wherein the designed throughput capacity of said layer transfer subsystem, less any one transfer plate, is less than the designed throughput capacity of said product conveyor.

9. A case loading system as in claim 1, said product conveyor having a designed throughput capacity for transporting cases of product thereon, said at least first and second layer forming stations, less any one of said layer forming stations, in combination, having a designed throughput capacity at least as great as said designed throughput capacity of said product conveyor.

10. A case loading system as in claim 9, said layer transfer subsystem comprising at least two transfer plates, each said transfer plate being adapted and configured for receiving a layer formed in said layer creating subsystem and delivering the layer to the load creating subsystem, wherein the designed throughput capacity of said layer transfer subsystem, less any one transfer plate, is less than the designed throughput capacity of said product conveyor.

11. A case loading system as in claim 10 wherein said load creating subsystem comprises at least two load forming stations.

12. A case loading system as in claim 1, said product conveyor having a first designed throughput capacity for transporting cases of product thereon, said at least first and second case converting subsystems, less any one of said case converting subsystems, in combination, having a designed throughput capacity at least as great as said designed throughput capacity of said product conveyor.

13. A case loading system as in claim 12, said layer transfer subsystem comprising at least two transfer plates, each said transfer plate being adapted and configured for receiving a layer formed in said layer creating subsystem and delivering the layer to the load creating subsystem, wherein the designed throughput capacity of said layer transfer subsystem, less any one transfer plate, is less than the designed throughput capacity of said product conveyor.

14. A case loading system as in claim 13 wherein said load creating subsystem comprises at least two load forming stations.

15. A case loading system as in claim 1, said product conveyor having a first designed throughput capacity for transporting cases of product thereon, said at least first and second case converting subsystems having capacities such that, when said product conveyor is operating at said first designed throughput capacity, the throughput from said product conveyor can be handled by said layer creating subsystem only by causing cases to be delivered from said product conveyor to at least two of said case converting subsystems.

16. A case loading system as in claim 15, said layer transfer subsystem comprising at least two transfer plates, each said transfer plate being adapted and configured for receiving a layer formed in said layer creating subsystem and delivering the layer to the load creating subsystem, wherein the designed throughput capacity of said layer transfer subsystem, less any one transfer plate, is less than the designed throughput capacity of said product conveyor.

17. A case loading system as in claim 4 wherein said load creating subsystem comprises at least two load forming stations.

18. A case loading subsystem as in claim 15, said at least first and second in-feed conveyors, less any one of said in-feed conveyors, in combination, having a designed throughput capacity at least as great as said designed throughput capacity of said product conveyor.

19. A case loading system as in claim 1, said product conveyor having a first designed throughput capacity for transporting cases of product thereon, and wherein said layer creating subsystem has a capacity such that, when said product conveyor is operating at said first designed throughput capacity, the throughput from said product conveyor can be handled by said layer creating subsystem by causing cases to be delivered from said product conveyor to at least all of said case converting subsystems, less one case converting subsystem.

20. A case loading system for receiving cases of product, and forming loads of the cases, in layers, said case loading system having an overall designed throughput capacity, and comprising;

(a) a layer creating subsystem, for receiving cases of product, and forming the cases into layers, said layer creating subsystem comprising at least three layer forming stations whereby, if any one of said layer forming stations fails, the remaining ones of said layer forming stations can, in combination, process cases at said overall designed throughput capacity, with each of said remaining ones of said layer forming stations, individually, processing ceases at less than said overall designed throughput capacity;

(b) a load creating subsystem, for receiving layers formed in said layer creating subsystem, and forming the layers into a load, said load creating subsystem comprising at least one load forming station; and (c) a layer transfer subsystem, for (i) receiving layers formed in said layer creating subsystem and for (ii) delivering the layers to said load creating subsystem, said layer transfer subsystem comprising at least first and second transfer plates, each of said first and second transfer plates being disposed and configured to receive a layer formed in said layer creating subsystem, and to deliver the layer to said load creating subsystem.

21. A case loading system for receiving cases of product, and forming loads of the cases, in layers, said case loading system having a first overall designed throughput capacity, and comprising:

(a) a layer creating subsystem comprising at least first and second layer forming stations;

(b) a load creating subsystem, comprising at least first and second load forming stations for receiving layers of cased product formed in said layer creating subsystem, and for forming the layers into loads; and (c) a controller for controlling operation of said case loading system, said load creating subsystem, less any one of said load forming stations, having a second designed throughput capacity less than said first overall designed throughput capacity, said at least first and second layer forming stations, less any one layer forming station, in combination, having a third designed throughput capacity at least as great as said first overall designed throughput capacity of said case loading system.

22. A case loading system as in claim 21, said case loading system further comprising a layer transfer subsystem, for (i) receiving formed layers from said layer creating subsystem, and for (ii) depositing the layers on corresponding loads being formed in said load creating subsystem, said layer transfer subsystem comprising at least first and second transfer plates, and wherein each said load forming station receives layers from only one of said transfer plates.

23. A case loading system as in claim 21, said layer creating subsystem including at least three layer forming stations whereby, if any one of said layer forming stations fails, the combination of the remaining ones of said layer forming stations can, in combination, process cases at said first overall designed throughput capacity with each said layer forming station, individually, processing cases at less than said first overall designed throughput capacity.

24. A case loading system for receiving cases of product, and forming loads of the cases, in layers, said case loading system having a first overall designed throughput capacity, and comprising:

(a) a layer creating subsystem comprising at least first and second layer forming stations;

(b) a load creating subsystem, for receiving layers of cased product formed in said layer creating subsystem, and for forming the layers into loads;

(c) a layer transfer subsystem, for (i) receiving layers formed in said layer creating subsystem, and for (ii) depositing the layers onto corresponding loads being formed in said load creating subsystem, said layer transfer subsystem comprising at least first and second transfer plates; and (d) a controller for controlling operation of said case loading system, said layer transfer subsystem, less any one of said transfer plates, having a second designed throughput capacity less than said first overall designed throughput capacity, said at least first and second layer forming stations, less any one layer forming station, in combination, having a third designed throughput capacity at least as great as said first overall designed throughput capacity of said case loading system.

25. A case loading system as in claim 24, said load creating subsystem comprising at least first and second load forming stations for receiving layers and forming the layers into loads, said load creating subsystem, less any one load forming station, having a fourth designed throughput capacity less than said first overall designed throughput capacity.

26. A case loading system as in claim 24, said layer creating subsystem including at least three layer forming stations whereby, if any one of said layer forming stations fails, the combination of the remaining ones of said layer forming stations can, in combination, process cases at said first overall designed throughput capacity with each said layer forming station, individually, processing cases at less than said first overall designed throughput capacity.

27. A method of handling cases of product, received on a product conveyor at a given rate in cases per minute, and forming loads with the cases in layers, by processing the cases through a case loading system, said case loading system comprising a layer creating subsystem comprising at least first and second case converting subsystems, each said case converting subsystem comprising a layer forming station and an in-feed conveyor, for receiving cases from said product conveyor and discharging cases to the corresponding layer forming station, a case demand sensor for signalling any current availability of capacity on the corresponding said in-feed conveyor, and a conveyor full sensor; a load creating subsystem comprising at least one load forming station; and a controller for controlling operation of said case loading system, said method comprising the steps of:

(a) sensing current availability of capacity in each case converting subsystem to receive ones of said cases of product into the corresponding in-feed conveyor; and (b) delivering ones of said cases of product from said product conveyor to said layer creating subsystem in accordance with said sensed current availability of capacity of each said case converting subsystem to receive cases, whereby the number of cases per minute processed by any one case converting subsystem is less than the number of cases per minute delivered to said layer creating subsystem by said product conveyor.

28. A method as in claim 27 and including, once having begun delivering cases to a given said case converting subsystem, continuing to deliver to said given case converting subsystem, all subsequent cases delivered by said product conveyor until said conveyor full sensor indicates that said given case converting subsystem is full.

29. A method as in claim 28 and including delivering cases from said product conveyor to said case converting subsystems in an order corresponding to the sequence in which available capacity in said case converting subsystems is sensed.

30. A method of handling cases of product, received on a product conveyor at a given rate in cases per minute, and forming loads with the cases in layers, said method comprising receiving the cases into a case loading system, at said given rate, and processing the cases through said case loading system, said case loading system comprising a layer creating subsystem comprising at least first and second case converting subsystems, a layer transfer subsystem comprising at least one layer transfer plate, a load creating subsystem comprising at least one load forming station, said case loading system having an overall throughput capacity capable of processing cases at said given rate, said layer transfer subsystem and said load creating subsystem having throughput capacities such that failure of operation at any said layer transfer plate or at any load forming station reduces the overall throughput capacity of said case loading system to a capacity below said given rate of receipt of product from said product conveyor, said layer creating subsystem having sufficient throughput capacity that any one case converting subsystem can fail and said case loading system maintains said overall throughput capacity, including throughput through the remaining said case converting subsystems, at a rate at least as great as said given rate of receipt of product from said product conveyor.

31. A method as in claim 30, including processing cases of product through all said case converting subsystems so long as all said case converting subsystems are operational, shutting down one said case converting subsystem when an operational failure occurs in the respective case converting subsystem, and subsequently diverting all cases delivered by said product conveyor to the remaining ones of said case converting subsystems, correcting the failure, and again processing cases of product through all case converting subsystems, all while receiving cases from said product conveyor at said given rate, and processing all cases so delivered, at said given rate, without accumulating any substantial quantity of the cases received.

32. A method as in claim 31, said method including providing, in said case loading system, at least three case converting subsystems whereby, when a failure occurs in one said case converting subsystem, and all cases are delivered to the remaining ones of said case converting subsystems, the rate of flow of cases through any one of said remaining ones of said case converting subsystems is less than the given rate of receipt of cases from said product conveyor into said case loading system.

33. A method as in claim 30, said case loading system further comprising an overflow conveyor, each said case converting subsystem having a designed throughput capacity, said method including the step, when a second case converting subsystem fails before a first failed case converting subsystem is restored to operation, continuing to process cases through remaining operational ones of said case converting subsystems, at the respective capacities of said remaining operational ones of said case converting subsystems, and diverting, to said overflow conveyor, cases delivered by said product conveyor which are in excess to the capacities of the remaining operational ones of said case converting subsystems.

34. A method of designing and forming a case loading system for receiving cases of product and forming loads of the cases, in layers, said case loading system having a first overall designed throughput capacity, and having a layer creating subsystem, a load creating subsystem, and a layer transfer subsystem, and wherein cased products pass sequentially through said layer creating subsystem, said layer transfer subsystem, and said load creating subsystem, said method comprising the steps of:

(a) determining relative amounts of potentially disruptive failure time caused by each of said layer creating subsystem, said layer transfer subsystem, and said load creating subsystem;

(b) for any said subsystem causing a disproportionate amount of potentially disruptive failure time, providing in said subsystem at least two sets of parallel processing stations, with a combined processing capacity in said subsystem, and in said parallel processing stations, such that when any one said set of said parallel processing stations fails, the remaining operational ones of said sets of parallel processing stations, in combination, have a designed throughput capacity at least as great as said first overall designed throughput capacity; and (c) arranging the subsystems designed in paragraphs (a) and (b) above, in the following manner:
  (i) said layer creating subsystem being connected to said layer transfer subsystem to deliver cases of product thereto,
  (ii) said layer transfer subsystem being connected to said load creating subsystem to deliver formed layers of cases of product thereto.

* * * * *